US006871842B2

(12) United States Patent
Sutton

(10) Patent No.: US 6,871,842 B2
(45) Date of Patent: Mar. 29, 2005

(54) HAND WINCH HANDLE WITH RELEASE FEATURE THAT PERMITS CABLE TO WIND OFF OF WINCH DRUM WITHOUT HANDLE ROTATION

(76) Inventor: James A. Sutton, 228 Oakhurst Rd., Statesville, NC (US) 28677

( * ) Notice: Subject to any disclaimer, the term of this patent is extended or adjusted under 35 U.S.C. 154(b) by 64 days.

(21) Appl. No.: 10/321,736

(22) Filed: Dec. 17, 2002

(65) Prior Publication Data

US 2004/0113007 A1 Jun. 17, 2004

(51) Int. Cl.[7] .................................................. B66D 1/00
(52) U.S. Cl. ....................... 254/342; 236/49.5; 119/493
(58) Field of Search ................................ 254/342, 362, 254/378; 236/46, 49, 49.5; 119/21, 493

(56) References Cited

U.S. PATENT DOCUMENTS

| | | | | |
|---|---|---|---|---|
| 1,069,195 A | * | 8/1913 | Skiff ............................ | 254/356 |
| 1,453,227 A | * | 4/1923 | Murray ........................ | 254/346 |
| 1,936,642 A | * | 11/1933 | Ramsey ....................... | 254/344 |
| 1,956,806 A | * | 5/1934 | Mitzen et al. ............... | 254/342 |
| 2,678,191 A | * | 5/1954 | Jensen ......................... | 254/330 |
| 3,051,446 A | * | 8/1962 | Nelson et al. ............... | 254/356 |
| 3,765,651 A | * | 10/1973 | Lifferth ....................... | 254/342 |
| 3,915,377 A | * | 10/1975 | Sutton, Jr. ................... | 236/49.1 |
| 4,113,175 A | * | 9/1978 | Sutton, Jr. ................... | 236/46 A |
| 5,176,365 A | * | 1/1993 | Best ............................. | 254/342 |
| 5,607,143 A | * | 3/1997 | Regal .......................... | 254/342 |

* cited by examiner

Primary Examiner—Emmanuel Marcelo
(74) Attorney, Agent, or Firm—Adams Evans P.A.

(57) ABSTRACT

A hand winch that includes a drum for carrying a strand wound thereon and including gear teeth, a drive gear having teeth thereon mounted in a driving relation to the gear teeth of the drum, and a handle assembly mounted on the drive gear for rotating the drive gear as the handle assembly is rotated. An engagement assembly 8 is positioned intermediate the drive gear and the handle assembly for winding the strand onto or off of the drum by the handle assembly when the strand is under tension and disengaging the handle assembly from the drive gear when tension on the strand is released to allow the drum to rotate while the handle assembly is stationary.

19 Claims, 9 Drawing Sheets

HAND WINCH HANDLE WITH RELEASE FEATURE THAT PERMITS CABLE TO WIND OFF OF WINCH DRUM WITHOUT HANDLE ROTATION

TECHNICAL FIELD AND BACKGROUND OF THE INVENTION

This invention relates to a winch handle with a release feature that permits the cable to wind off of the winch drum without the handle rotating during the entire time the drum is rotating. The particular embodiment disclosed for purposes of illustration in this application is of a curtain control system for animal enclosures such as poultry houses. However, the invention has application in any environment where automatic release of a winch would be desirable for either functional or safety reasons.

Animal enclosures of this type and prior art systems for controlling ventilation and preventing or reducing animal mortality during power interruptions and extremely warm weather are disclosed in applicant's prior U.S. Pat. Nos. 3,915,377, 4,113,175, 4,428,278, 4,986,469 and 5,325,813, among others. Systems such as shown in these prior patents have substantially reduced animal mortality and labor requirements for raising poultry in large, environmentally controlled enclosures.

The present invention improves on prior art hand winch designs by providing a winch handle that permits faster operation of the curtain drop mechanism in the event of a power failure or other event triggering operation of the curtain drop device. The invention also improves safety by eliminating rapid rotation of the winch handle upon release and thus preventing accidental injury that might otherwise result from someone standing too close to a rapidly spinning winch handle during a release.

SUMMARY OF THE INVENTION

Therefore, it is an object of the invention to provide a winch that can be released to permit unwinding without full rotation of the winch handle.

It is another object of the invention to provide a winch that permits safe and secure winding and unwinding of a winch under heavy loads.

It is another object of the invention to provide a release means of permitting a winch to unwind without rotation of the handle that can be retrofitted onto an existing winch.

These and other objects of the present invention are achieved in the preferred embodiments disclosed below by providing a hand winch that includes a drum for carrying a strand wound thereon and including gear teeth, a drive gear having teeth thereon mounted in a driving relation to the gear teeth of the drum, and a handle assembly mounted on the drive gear for rotating the drive gear as the handle assembly is rotated. Engagement means are positioned intermediate the drive gear and the handle assembly for winding the strand onto or off of the drum by the handle assembly when the strand is under tension and disengaging the handle assembly from the drive gear when tension on the strand is released to allow the drum to rotate while the handle assembly is stationary.

According to one preferred embodiment of the invention, the engagement means comprises an engagement element mounted for rotation with the drive gear and adapted for selective cooperative engagement with a mating retention element carried by the handle assembly for locking the drive gear and handle assembly together for unison winding movement.

According to another preferred embodiment of the invention, the engagement element comprises a cam carried on the drive gear and the retention element comprises a notch carried on the other of the handle assembly or the drive gear, and further wherein the cam and the notch cooperate for locking the drive gear and handle assembly together for unison movement when the strand is under tension.

According to yet another preferred embodiment of the invention, the cam is carried on a shaft concentric with the drive gear and the notch is formed on the handle assembly.

According to yet another preferred embodiment of the invention, the cam comprises a washer having at least one segment of increased radius and sized for fitting into the notch on the handle assembly.

According to yet another preferred embodiment of the invention, the handle assembly includes a handle disk mounted concentric with the drive gear and to which a winding handle is pivotally-attached for non-concentric pivotal movement relative to the drive gear between a winding position and a release position.

According to yet another preferred embodiment of the invention, the handle disk includes a first stop element carried on the periphery of the handle disk for engaging with a cooperating second stop element carried by a support in interfering relation to the first stop element for stopping rotation of the handle assembly when tension is released on the strand.

According to yet another preferred embodiment of the invention, the first stop element comprises an increased radius portion of the handle disk and the second stop element comprises a pin placed on the support at an interference position relative to the increased radius portion of the handle disk.

A hand winch that includes a winding drum for carrying a strand wound thereon and including gear teeth around a periphery thereof, and a drive gear having teeth thereon mounted in a driving relation to the gear teeth of the drum. A handle carries the drive gear for rotating the drive gear as the handle is rotated. An engagement assembly is positioned intermediate the drive gear and the handle for allowing the strand to be wound onto or off of the drum by the handle when the strand is under tension and disengaging the handle from the drive gear when tension on the strand is released to allow the drum to rotate while the handle is stationary.

According to yet another preferred embodiment of the invention, the engagement mechanism includes a handle disk mounted concentrically with the drive gear for rotation therewith, the handle being pivotally mounted on the handle disk for eccentric pivotal movement between an engaged winding position and a disengaged position. A cam is carried by the handle disk and positioned for engagement with the handle in the engaged winding position and disengagement with the handle in the disengaged position of the handle.

According to yet another preferred embodiment of the invention, a notch is formed in the handle and positioned for receiving the cam when the handle is in the engaged winding position and disengagement with the handle in the disengaged position of the handle.

According to yet another preferred embodiment of the invention, a curtain control system is provided for controlling curtains of an animal enclosure having an electrically-operated forced air ventilation system and a plurality of adjustable drop curtains. Each of the drop curtains has an associated curtain control device for providing supplemental ventilation during power failure or excess temperatures in the enclosure. The improvement comprises a hand winch that includes a drum for carrying a strand wound thereon and including gear teeth, and a drive gear having teeth thereon mounted in a driving relation to the gear teeth of the drum. A handle assembly is mounted on the drive gear for rotating the drive gear as the handle assembly is rotated. Engagement means are positioned intermediate the drive gear and the handle assembly for winding the strand onto or off of the drum by the handle assembly when the strand is under tension and disengaging the handle assembly from the drive gear when tension on the strand is released to allow the drum to rotate while the handle assembly is stationary. Magnetically-attractable winch release means is provided and is moveable between a hold position for normally holding the winch handle stationary to prevent unwinding of the curtain control cord and a release position to release the winch handle assembly and thereby release of the curtains to a dropped, open position. An electromagnet magnetically holds the winch release means in the hold position during application of current thereto and permits movement of the winch release means to the release position upon interruption of electric current thereto. The electromagnet propagating a magnetic field surrounds the winch release means and the electromagnet while in the hold position. An electrical circuit connects a plurality of the curtain control devices together for simultaneous operation.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
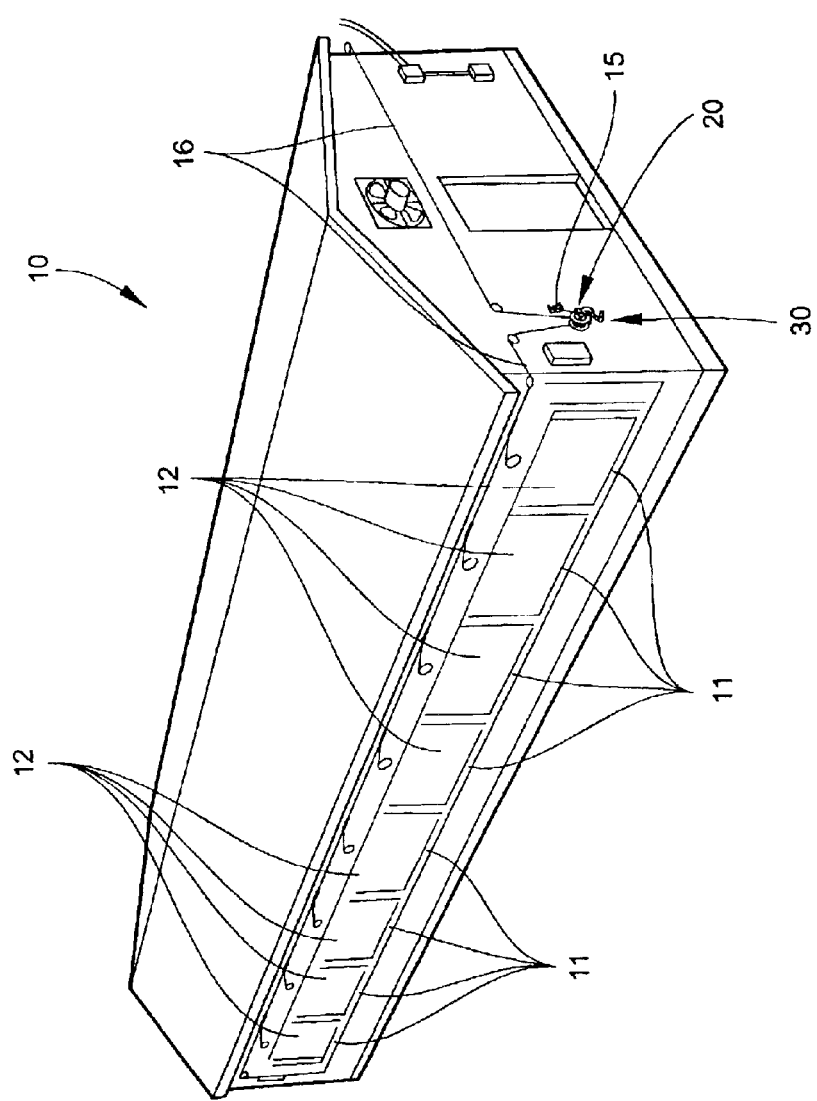
FIG. 1 is a perspective view of a poultry enclosure equipped with a curtain drop system using the handle winch according to an embodiment of the present invention.
Figure 2:
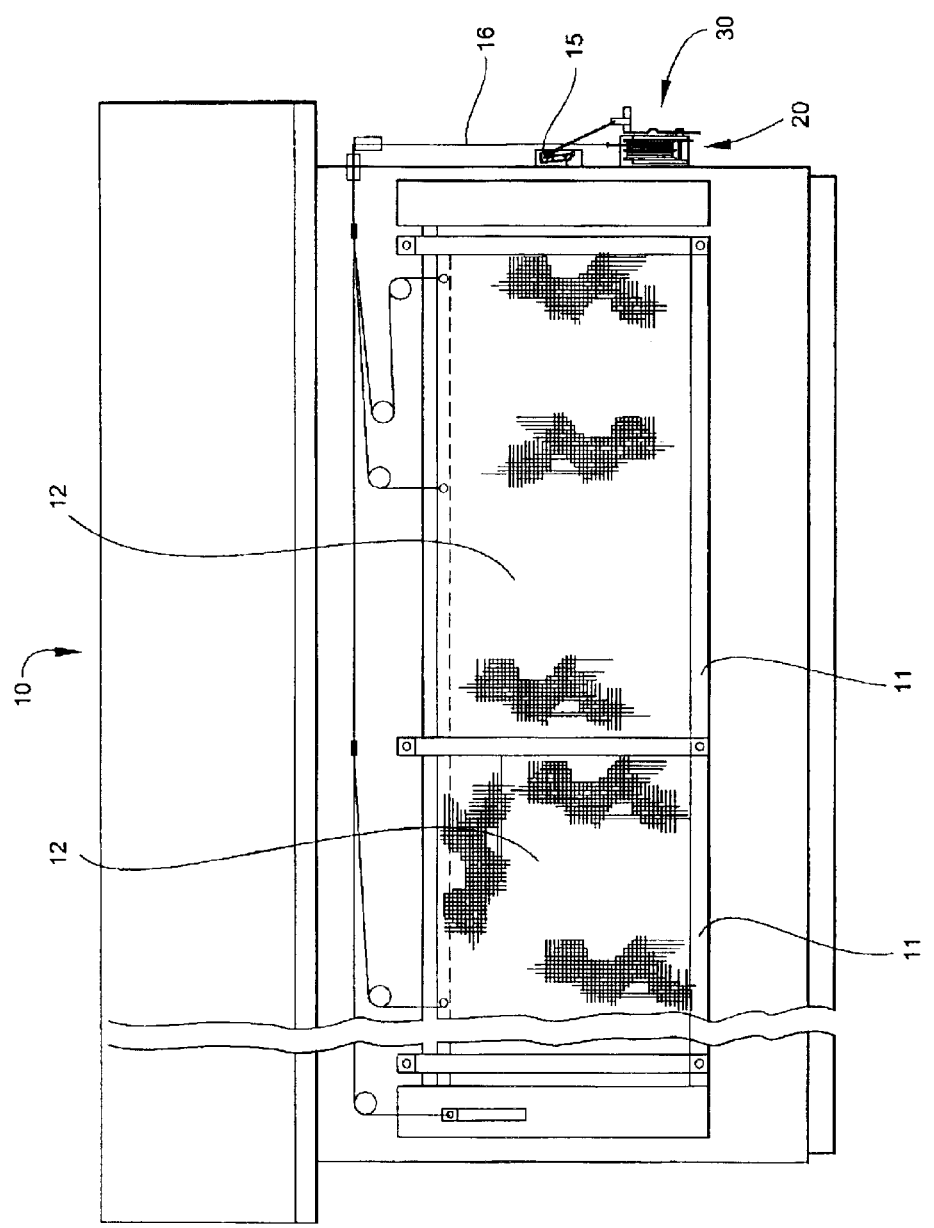
FIG. 2 is a fragmentary enlarged side elevation of the poultry enclosure of FIG. 1.

Referring now specifically to the drawings, a poultry enclosure utilizing a hand winch according to the present invention is illustrated in FIGS. 1 and 2, and shown generally at reference numeral 10. The enclosure 10 includes windows 11 normally covered by drop curtains 12 during powered ventilation. In the event of a power failure, the curtains are dropped by an electronic curtain release device 15 to provide temporary natural ventilation. The curtain release device is fully disclosed in applicant's above-referenced patents and are incorporated by reference.

A hand winch 20 that includes an engagement mechanism 30 is also shown in FIGS. 1 and 2. The curtains 12 are raised to their normal raised position by winding a cable 16 to which the curtains 12 are attached.

Figure 3:
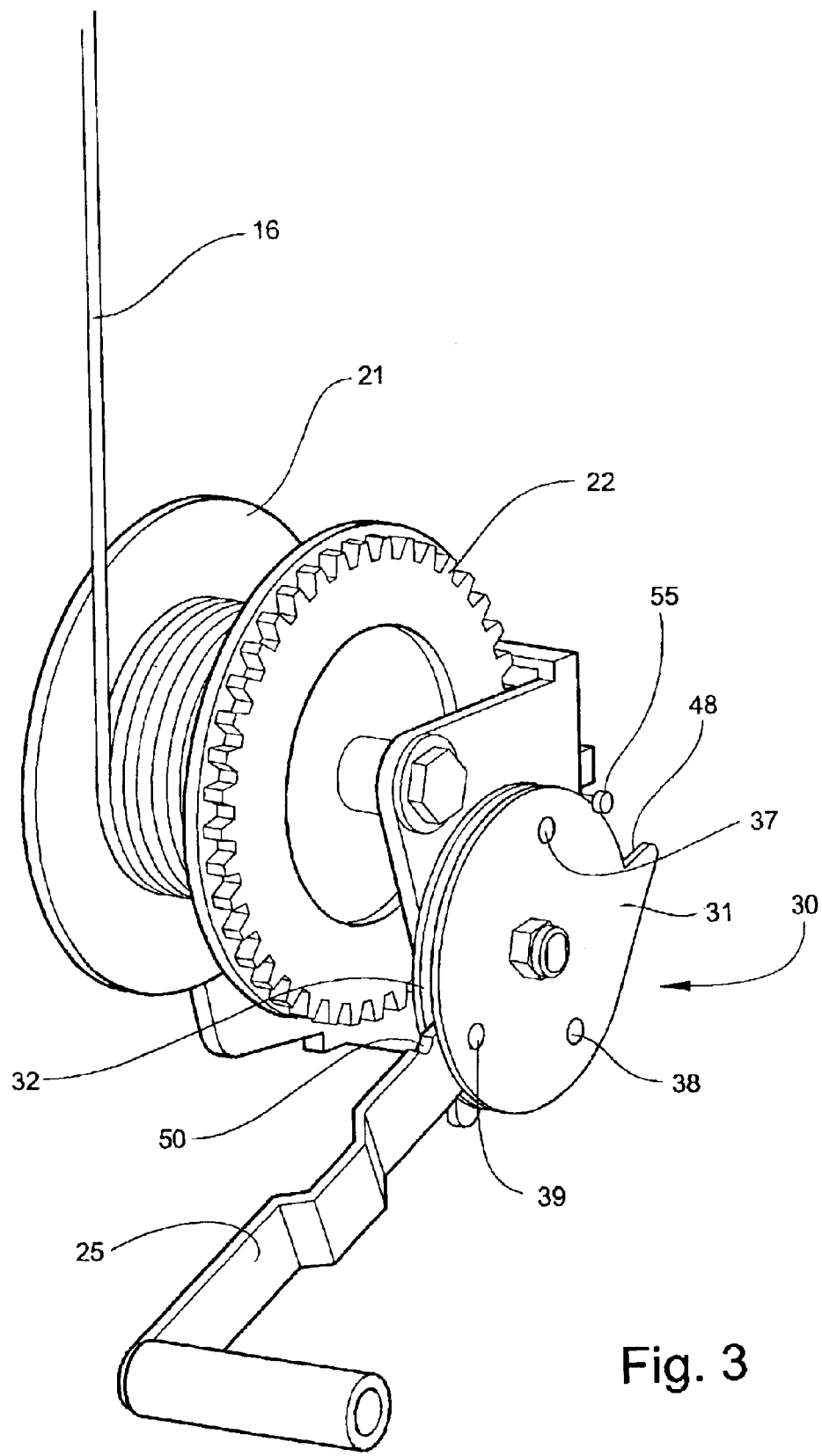
FIG. 3 is a perspective view of a hand winch according to an embodiment of the present invention.
Figure 6:
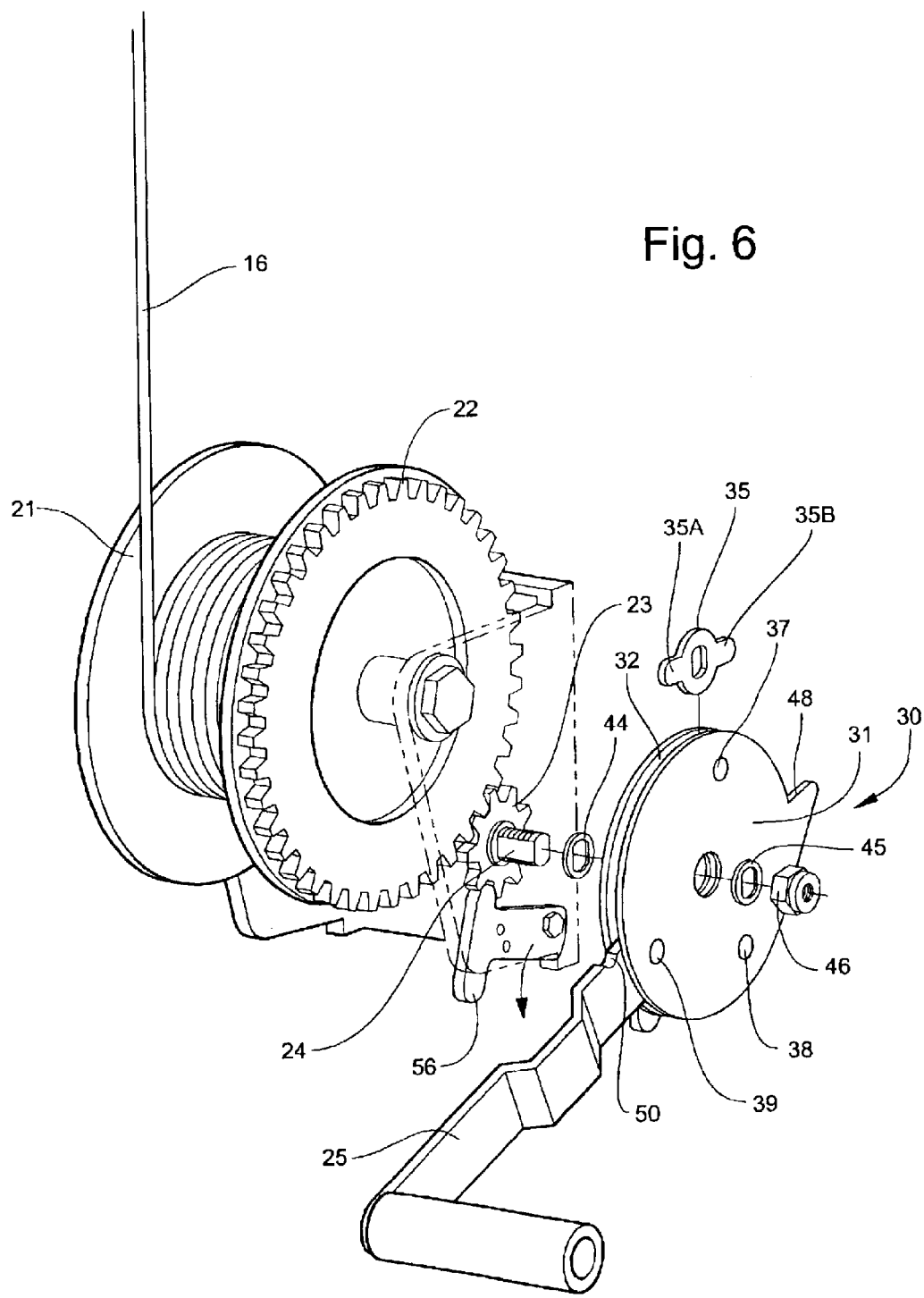
FIG. 6 is a partially-exploded view showing connection of the engagement mechanism to the winding drum of the hand winch.

Referring now to FIGS. 3 and 6, the hand winch 20 includes a drum 21 for carrying the cable 16 thereon. The drum includes gear teeth 22 extending around the peripheral circumference of the drum 21 that mate with a drive gear 23 carried on a drive gear shaft 24. See FIG. 6. A handle assembly 25 rotates the drive gear 23 as the handle assembly is rotated by means of the engagement mechanism 30.

Figure 5:
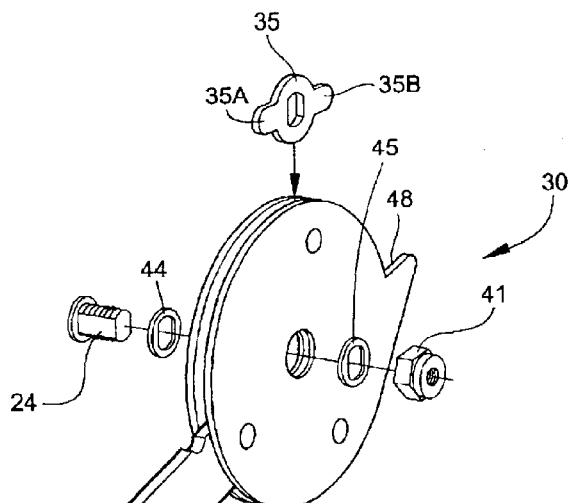
FIG. 5 is a partially-exploded view of the engagement mechanism portion of the hand winch shown in FIG. 3.
Figure 4:
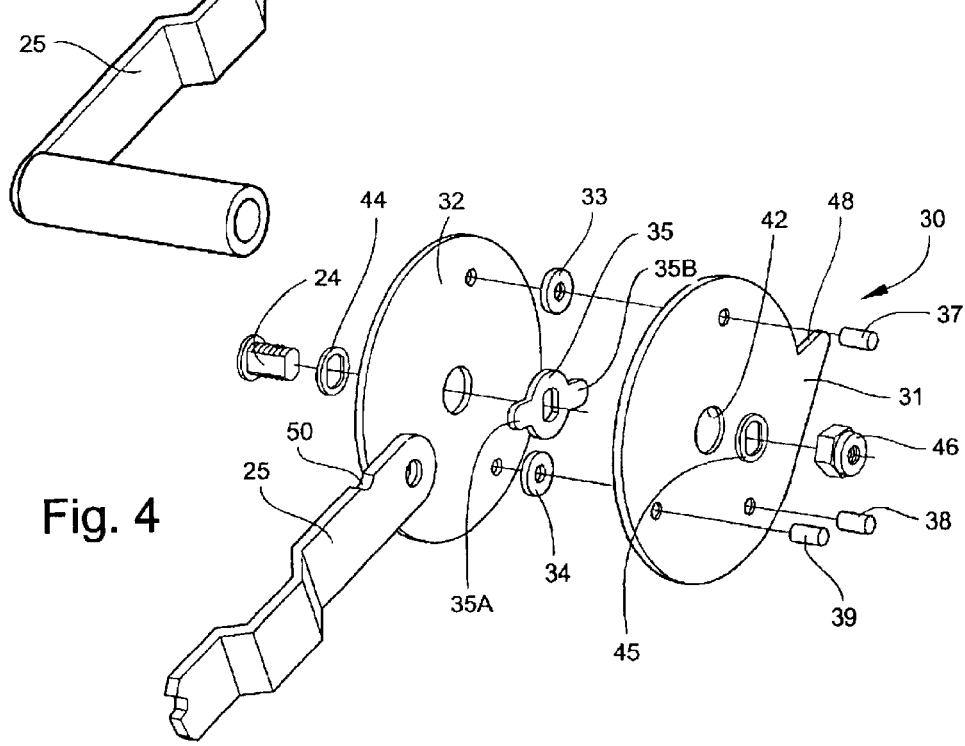
FIG. 4 is an exploded view of the engagement mechanism portion of the hand winch shown in FIG. 3.

Referring now also to FIGS. 4 and 5, the engagement mechanism 30 is constructed of two concentric handle disk plates 31 and 32 spaced-apart by two washers 33, 34, a cam washer 35 and the thickness of the handle 25. The cam washer includes two cam lobes 35A, 35B. The washers 33, 34 are captured by pins 37, 38 and 39. The pin 39 also mounts the handle 25 between the handle disk plates 31 and 32 for rotation about an axis defined by the pin 39. Note that the pin 39 Is eccentric to the axis of rotation of the handle disk plates 31 and 32 defined by a hole 42. The handle disk plates 31 and 32 are mounted on the drive gear shaft 24 but are free to rotate about the drive gear shaft 24 unless restrained. The handle disk plates 31 and 32 are retained on the drive gear shaft 24 by a pair of washers 44, 45 and a hex nut 46. The flats on the drive gear shaft 24 require that the drive gear 23 end the cam 35 rotate together.

This handle disk plates 31 and 32 themselves are fabricated of flat metal plate steel and are generally circular with a stop element 48 of increased radius formed on the circumference.

Figure 7:
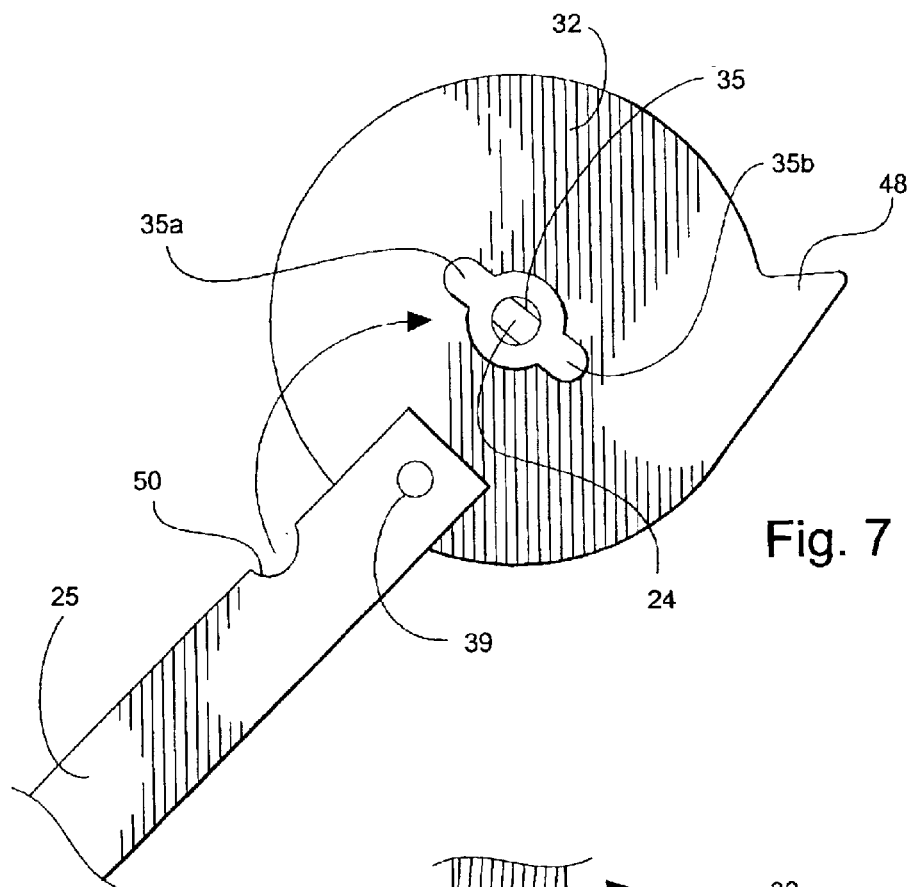
FIG. 7 is a schematic view showing engagement of the engagement mechanism.
Figure 8:
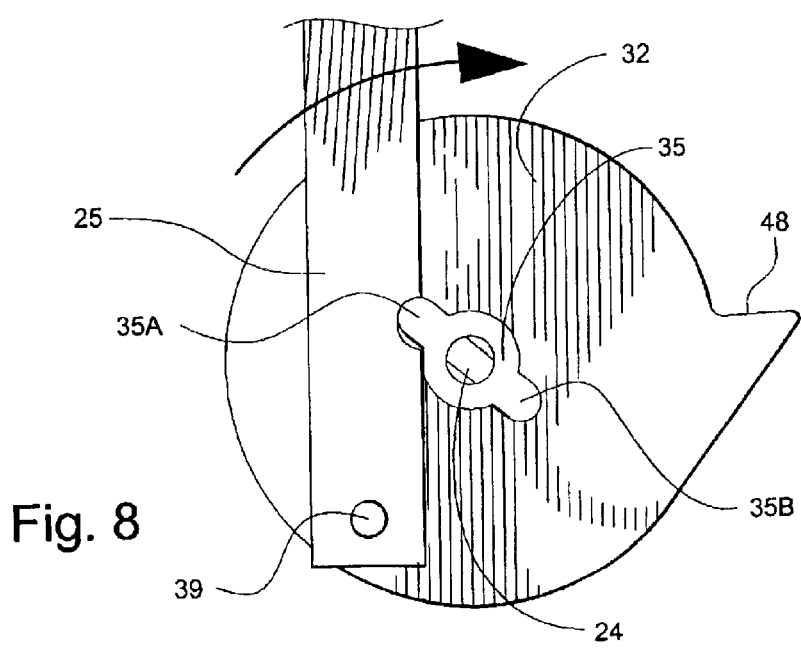
FIG. 8 is a schematic view showing winding with the engagement mechanism engaged.

The handle 25 is provided with a notch 50. Referring now to FIGS. 7 and 8, to operate the winch 20 to raise the curtains 12 the handle 25 is rotated on the pin 39 against the cam 35 until either the cam lobe 35A or 35B locks into the notch 50 on the handle 25. As is shown in FIG. 8, the handle 25 is then rotated in a clockwise direction in the normal fashion. The radial inwardly-directed force of the handle 25 against the cam 35 retains the cam lobe 35A or 35B in the notch 50 and causes the handle to rotate the handle disk plates 31 and 32. The cable 16 is wound onto the drum 21. The cable 16 on the drum 21 can also be let off of the drum 21 by slowly rotating the handle 25 in the counterclockwise direction. Care must be taken to rotate the handle 25 in such a manner as to maintain tension on the cable 16. So long as this is done, the cam lobe 35A will remain in the notch 50 and the curtains 12 can be slowly lowered if desired.

Figure 9:
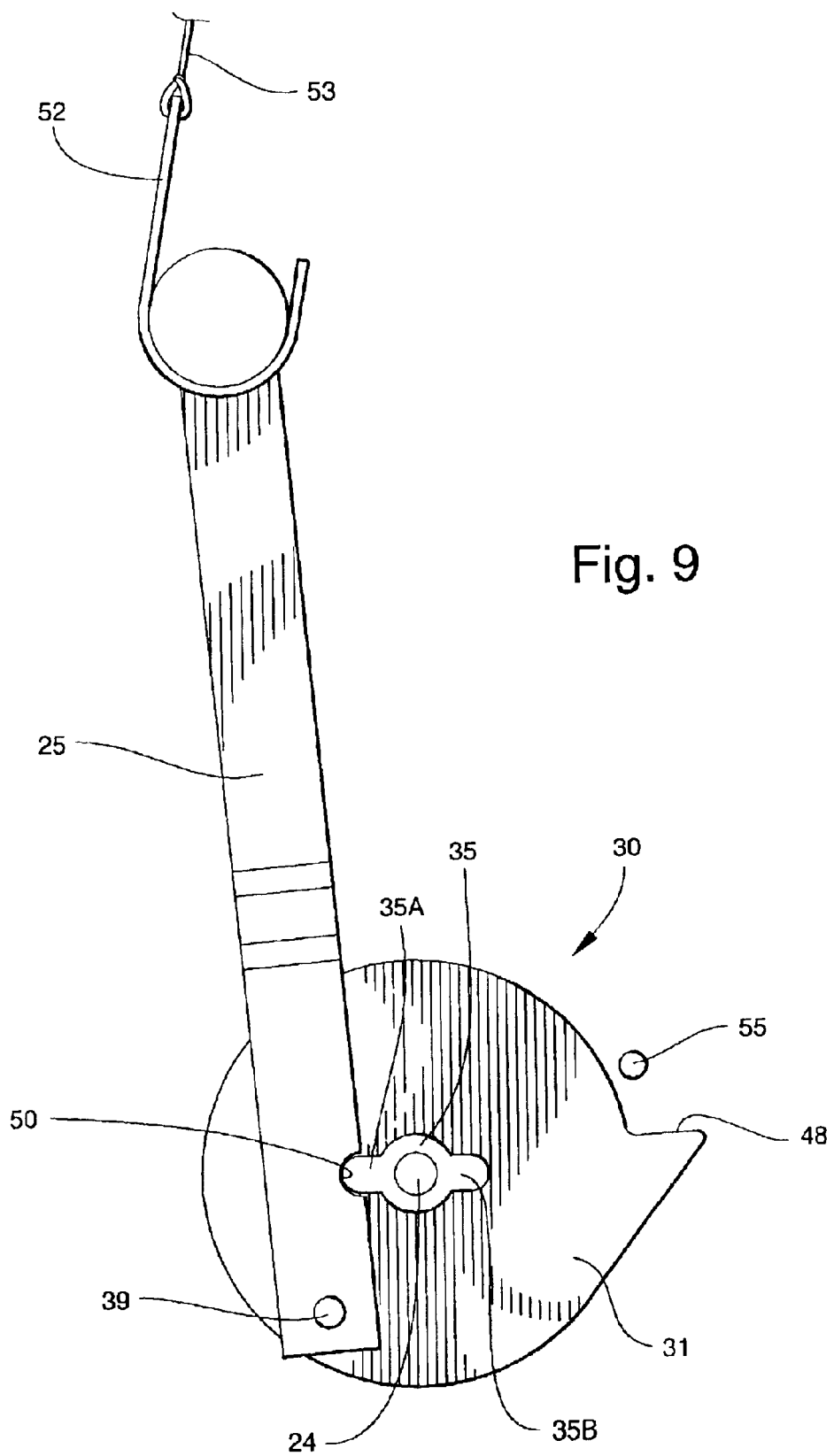
FIG. 9 is a partial side elevation showing the engagement mechanism in a stationary tensioned condition.

As is shown in FIG. 9, when the curtains 12 have been raised to the proper level, the handle 25 is locked by a hook 52 on the end of a retention cord 53 that is, in turn, looped onto the curtain release device 15. As noted above, the operation of the curtain release device 15 is fully explained in applicant's prior patents. The tension of the cable 16 urges the drum 21 and thus the handle disk plates 31 and 32 in the counterclockwise direction and thus retains the cam lobe 35A in the notch 50. The retention cord 53 retains the handle 25 in the position shown in FIG. 9. Thus, the handle 25 prevents the drum 21 from unwinding. After the handle 25 is locked into the correct position as shown in FIG. 9, a stop pin 55 is inserted into position slightly above the stop element 48 of the handle disk plates 31, 32.

Figure 10:
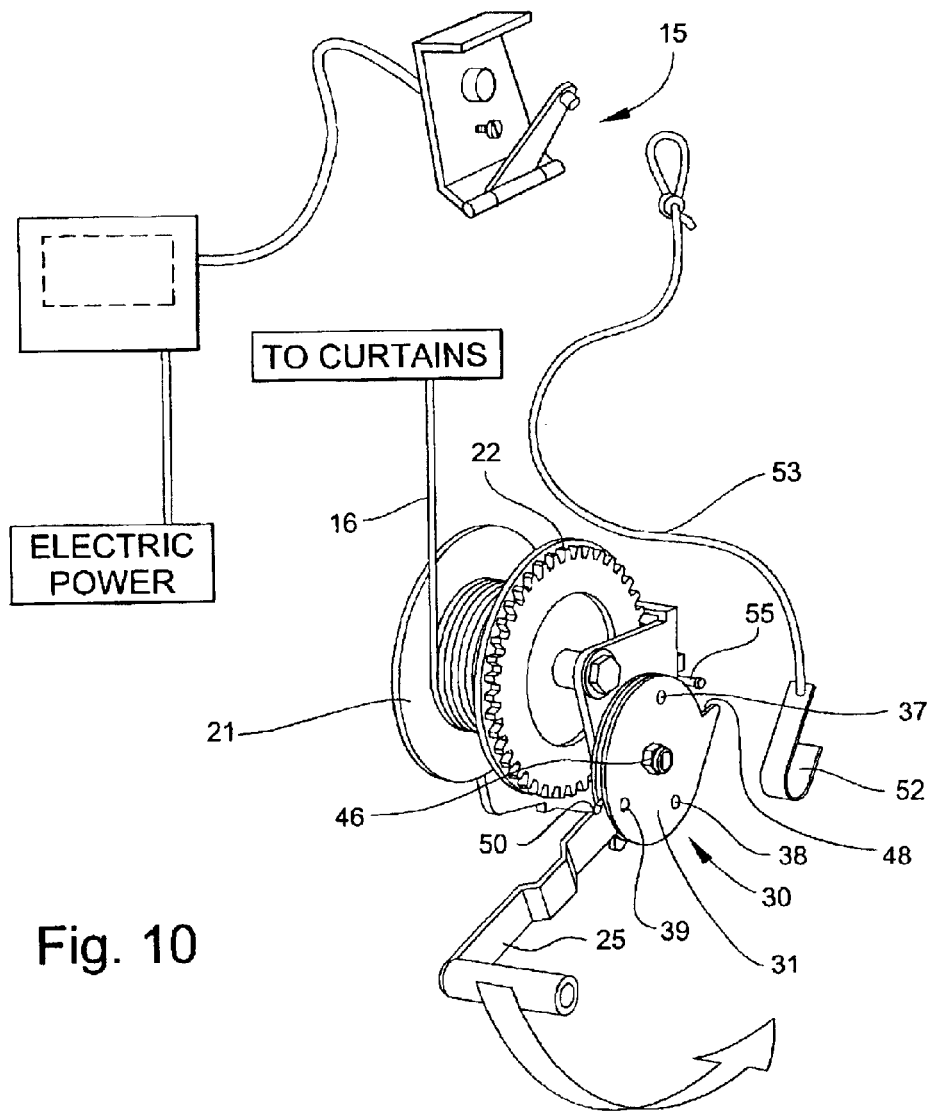
FIG. 10 is a view showing operation of the curtain release device and disengagement of the engagement mechanism.
Figure 11:
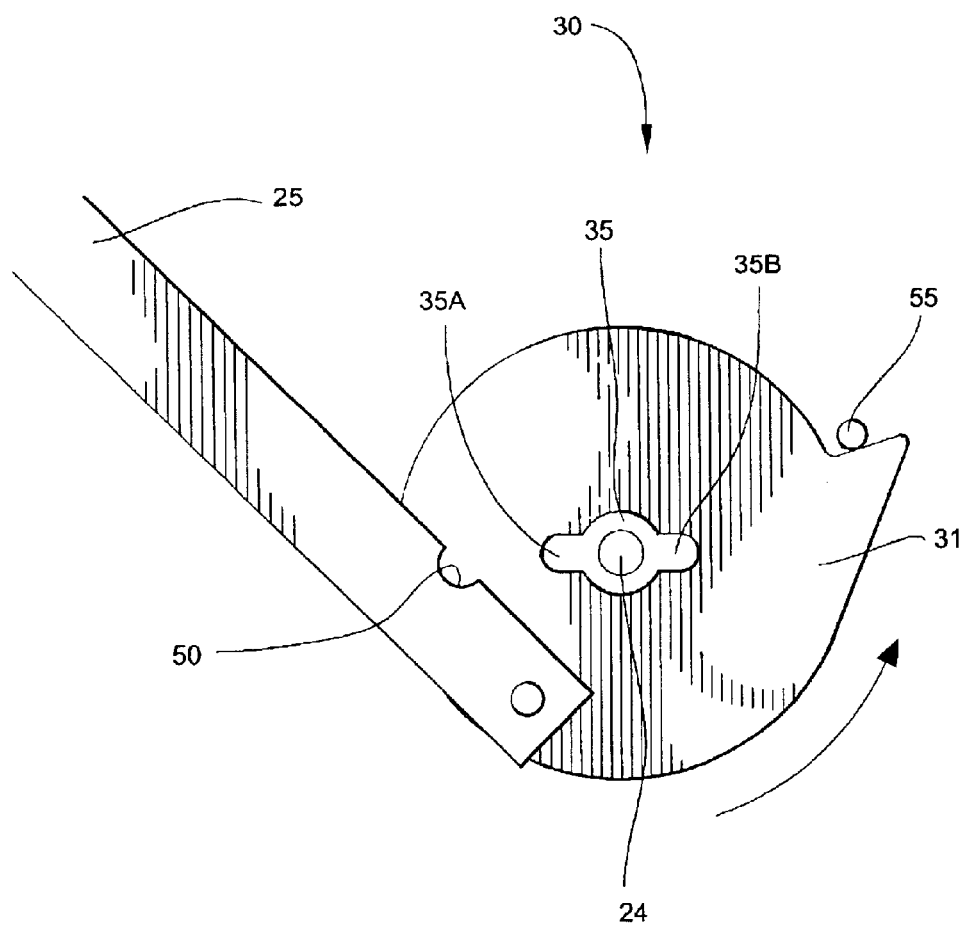
FIG. 11 is a schematic view showing rotation of the handle disk being stopped by the stop pin.

The handle 25 remains in the position shown in FIG. 9 until a power failure or some other avant causes release of the curtain 12, as shown in FIG. 10. Release of the retention cord 53 by the curtain release device 15 releases the handle 25. In prior art configurations, the handle would then spin rapidly as the drum paid out the cable. However, in the present invention, when the retention cord 53 releases the handle 25, the handle fails in a counterclockwise direction away from the center of the handle disk plates 31, 32. The handle disk plates 31, 32 begin to rotate counterclockwise under the tension on the cable 16, but are stopped by the impact between the stop element 48 and the stop pin 55. As soon as the handle 25 moves away from the cam lobe 35A, the cam lobe 35A is freed from the rotational restraint of the notch 50 and the cam 35, drive gear 23 and drum 21 are thus permitted to freewheel as the cable 16 pays off of the drum 21. The pawl 56, normally used to lock the drive gear 23 against rotation, is left disengaged so that it is only the restraint of the handle 25 that prevents the drive gear 23 from rotating when the cam lobe 35A is positioned in the notch 50.

It is emphasized that the above description with reference to a poultry enclosure is for purposes of illustration and example only. The winch 20 and engagement mechanism 30 have application in any environment where a hand winch is used and where it is desirable to prevent the handle from spinning as the cable is being paid off of the drum.

The number of lobes on the cam is variable. The two lobes 35A, 35B permits engagement between the handle 25 and the cam 35 with no more than one-half turn of the handle disk plates 31, 32. Either one, three or four lobes could also be used. Other desires are possible, as well. For example, a gear mounted on the drive gear shaft 24 in place of the cam 35 and a gear rack teeth on the handle 25 in place of the notch 50 would also function suitably.

A winch handle with a release feature that permits the cable being wound to pay off of the winch drum without the handle rotating is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A hand winch, comprising:
   (a) a drum for carrying a strand wound thereon and including gear teeth;
   (b) a drive gear having teeth thereon mounted in a driving relation to the gear teeth of the drum;
   (c) a handle assembly mounted on operably connected and pivotally-attached relative to the drive gear for rotating the drive gear as the handle assembly is rotated;
   (d) an engagement mechanism positioned intermediate the drive gear and the handle assembly for winding the strand onto or off of the drum by the handle assembly when the strand is under tension and disengaging the handle assembly tram the drive gear when the handle assembly is released to allow the drum to rotate while the handle assembly is not being driven.

2. A hand winch according to claim 1, wherein the engagement mechanism comprises an engagement element mounted for rotation with the drive gear and adapted for selective cooperative engagement with a mating retention element carried by the handle assembly for locking the drive gear and handle assembly together for unison winding movement.

3. A hand winch according to claim 2, wherein the engagement element comprises a cam carried on one of the handle assembly or the drive gear and the retention element comprises a notch carried on the other of the handle assembly or the drive gear, and further wherein the cam and the notch cooperate for locking the drive gear and handle assembly together for unison movement when the strand is under tension.

4. A hand winch according to claim 3, wherein the cam is carried on a shaft concentric with the drive gear and the notch is formed on the handle assembly.

5. A hand winch according to claim 4, wherein the cam comprises a washer having at least one segment of increased radius and sized for fitting into the notch on the handle assembly.

6. A hand winch according to claim 1, 2, 3, 4 or 5, wherein the engagement mechanism includes a handle disk mounted concentric with the drive gear end to which the handle assembly is pivotally-attached for non-concentric pivotal movement relative to the drive gear between a winding position and a release position.

7. A hand winch according to claim 6, wherein the handle disk includes a first stop element carried on the periphery of the handle disk for engaging with a cooperating second stop element carried by a support in interfering relation to the first stop element for stopping rotation of the handle assembly when tension is released on the strand.

8. A hand winch according to claim 7, wherein said first stop element comprises an increased radius portion of the handle disk and the second stop element comprises a pin placed on the support at an interference position relative to the increased radius portion of the handle disk.

9. A hand winch, comprising:
   (a) a winding drum for carrying a strand wound thereon and including gear teeth around a periphery thereof;
   (b) a drive gear having teeth thereon mounted in a driving relation to the gear teeth of the drum;
   (c) a handle operably connected to the drive gear for rotating the drive gear as the handle is rotated;
   (d) engagement mechanism positioned intermediate the drive gear and the handle for allowing the strand to be wound onto or off of the drum by the handle and disengaging the handle from the drive gear when the handle is released to allow the drum to rotate while the handle is free.

10. A hand winch according to claim 9, wherein said engagement mechanism comprises:
    (a) a handle disk mounted concentrically with the drive gear for rotation therewith;
    (b) the handle being pivotally mounted on the handle disk for eccentric pivotal movement between an engaged winding position and a disengaged position;
    (c) a cam carried by the handle disk and positioned for engagement with the handle in the engaged winding position and disengagement with the handle in the disengaged position of the handle.

11. A hand winch according to claim 10, and including a notch formed in the handle and positioned for receiving the cam when the handle is in the engaged winding position and disengagement with the handle in the disengaged position of the handle.

12. In a curtain control system for controlling curtains of an animal enclosure having an electrically-operated forced air ventilation system and a plurality of adjustable drop curtains, each of said drop curtains having an associated curtain control device for providing supplemental ventilation during power failure or excess temperatures in the enclosure; the improvement comprising:

(a) a hand winch comprising:
  (i) a drum for carrying a strand wound thereon and including gear teeth;
  (ii) a drive gear having teeth thereon mounted in a driving relation to the gear teeth of the drum;
  (iii) a handle assembly mounted an the drive gear for rotating the drive gear as the handle assembly is rotated;
  (iv) a catch mechanism positioned intermediate the drive gear and the handle assembly for winding the strand onto or off of the drum by the handle assembly when the strand is under tension and disengaging the handle assembly from the drive gear when the handle is released to allow the drum to rotate while the handle assembly is free;

(b) magnetically-attractable winch release means moveable between a hold position for normally holding the winch handle stationary to prevent unwinding of the curtain control cord and a release position to release the winch handle assembly and thereby release of the curtains to a dropped, open position;

(c) an electromagnet for magnetically holding the winch release means in the hold position during application of current thereto and for permitting movement of the winch release means to the release position upon interruption of electric current thereto, said electromagnet propagating a magnetic field surrounding the winch release means and the electromagnet while in the hold position: and (d) an electrical circuit connecting a plurality of the curtain control devices together for simultaneous operation.

13. A curtain control system according to claim 12, wherein the catch mechanism comprises an engagement element mounted for rotation with the drive gear and adapted for selective cooperative engagement with a mating retention element carried by the handle assembly for locking the drive gear and handle assembly together for unison winding movement.

14. A curtain control system according to claim 13, wherein the engagement element comprises a cam carried on one of the handle assembly or the drive gear and the retention element comprises a notch carried on the other of the handle assembly or the drive gear, and further wherein the cam and the notch cooperate for locking the drive gear and handle assembly together for unison movement when the strand is under tension.

15. A curtain control system according to claim 14, wherein the cam is carried on a shaft concentric with the drive gear and the notch is formed on the handle assembly.

16. A curtain control system according to claim 15, wherein the cam comprises a washer having at least one segment of increased radius and sized for fitting into the notch on the handle assembly.

17. A curtain control system according to claim 12, 13, 14, 15 or 16, wherein the handle assembly includes a handle disk mounted concentric with the drive gear and to which a winding handle is pivotally-attached for non-concentric pivotal movement relative to the drive gear between a winding position and a release position.

18. A curtain control system according to claim 17, wherein the handle disk includes a first stop element carried on the periphery of the handle disk for engaging with a cooperating second stop element carried by a support in interfering relation to the first stop element for stopping rotation of the handle assembly when tension is released on the strand.

19. A curtain control system according to claim 18, wherein said first stop element comprises an increased radius portion of the handle disk and the second stop element comprises a pin placed on the support at an interference position relative to the increased radius portion of the handle disk.

* * * * *

UNITED STATES PATENT AND TRADEMARK OFFICE
CERTIFICATE OF CORRECTION

PATENT NO. : 6,871,842 B2  
DATED : March 29, 2005  
INVENTOR(S) : Sutton, James A.

It is certified that error appears in the above-identified patent and that said Letters Patent is hereby corrected as shown below:

Column 5,  
Line 8, please delete "fails" and insert -- falls. --  
Line 50, please delete "mounted on."  
Line 58, please delete "tram" and insert -- from. --

Column 6,  
Line 18, please delete "end" and insert -- and. --  
Ine 40, please insert -- an -- after "(d)" and before "engagement. '

Column 7,  
Line 8, please delete "an" and insert -- on. --

Signed and Sealed this

Thirty-first Day of May, 2005

JON W. DUDAS  
*Director of the United States Patent and Trademark Office*